(12) United States Patent
Timor et al.

(10) Patent No.: US 11,256,921 B2
(45) Date of Patent: Feb. 22, 2022

(54) SYSTEM AND METHOD FOR IDENTIFYING EVENTS OF INTEREST IN IMAGES FROM ONE OR MORE IMAGERS IN A COMPUTING NETWORK

(71) Applicant: CAWAMO LTD, Hod Hasharon (IL)

(72) Inventors: Yaaqov Timor, Hod Hasharon (IL); David Yakov, Hod Hasharon (IL)

(73) Assignee: CAWAMO LTD, Hod Hasharon (IL)

( * ) Notice: Subject to any disclaimer, the term of this patent is extended or adjusted under 35 U.S.C. 154(b) by 0 days.

(21) Appl. No.: 17/140,160

(22) Filed: Jan. 4, 2021

(65) Prior Publication Data

US 2021/0209369 A1 Jul. 8, 2021

Related U.S. Application Data

(63) Continuation of application No. 17/139,312, filed on Dec. 31, 2020.
(Continued)

(51) Int. Cl.
*G06K 9/00* (2006.01)
*G06K 9/62* (2022.01)
(Continued)

(52) U.S. Cl.
CPC ..... *G06K 9/00718* (2013.01); *G06K 9/00335* (2013.01); *G06K 9/00771* (2013.01);
(Continued)

(58) Field of Classification Search
CPC ............. G06K 9/00718; G06K 9/6267; G06K 9/4652; G06K 9/6262; G06K 9/00335;
(Continued)

(56) References Cited

U.S. PATENT DOCUMENTS 8,527,445 B2   9/2013   Karins et al.
9,208,432 B2   12/2015  Buibas et al.
(Continued)

FOREIGN PATENT DOCUMENTS

CN   108255605   7/2018
CN   109543829   10/2018

OTHER PUBLICATIONS

Tasmanian Blog, "Tesla Filed Patent 'Enhanced object detection for autonomous vehicles based on field view", (2020) https://www.tesmanian.com/blogs/tesmanian-blog/patent-enhanced-object-detection-for-autonomous-vehicles-based-on-field-view.

*Primary Examiner* — Samir A Ahmed
(74) *Attorney, Agent, or Firm* — Pearl Cohen Zedek Latzer Baratz LLP (57) ABSTRACT

Methods and systems for identifying events of interest in images from imagers in an edge computing network, including: detecting a movement based on image processing in images captured by the imager, cropping an area of the at least one image where the movement is detected, applying a first machine learning (ML) algorithm having a deep neural network architecture to classify an object of interest in the cropped area of the at least one image, sending the at least one image to a server, when the first ML algorithm classifies the object of interest, applying a second ML algorithm having a deep neural network architecture to detect the object of interest in the at least one image where the object of interest is detected based on context analysis.

13 Claims, 8 Drawing Sheets

Related U.S. Application Data (60) Provisional application No. 62/956,648, filed on Jan. 3, 2020.

(51) Int. Cl.
*G06K 9/46* (2006.01)
*G06T 7/20* (2017.01)
*G06T 3/40* (2006.01)

(52) U.S. Cl.
CPC ......... *G06K 9/4652* (2013.01); *G06K 9/6262* (2013.01); *G06K 9/6267* (2013.01); *G06T 3/40* (2013.01); *G06T 7/20* (2013.01); *G06K 2009/00738* (2013.01); *G06T 2207/20081* (2013.01); *G06T 2207/20084* (2013.01); *G06T 2207/20132* (2013.01)

(58) Field of Classification Search
CPC ... G06K 2009/00738; G06T 7/20; G06T 3/40; G06T 2207/20081; G06T 2207/20084; G06T 2207/20132
See application file for complete search history.

(56) References Cited

U.S. PATENT DOCUMENTS

| | | | |
|---|---|---|---|
| 9,336,483 | B1 | 5/2016 | Abeysooriya et al. |
| 2010/0238286 | A1* | 9/2010 | Boghossian ..... G08B 13/19697 348/143 |
| 2015/0077326 | A1* | 3/2015 | Kramer ................. G06F 3/0325 345/156 |
| 2016/0180239 | A1 | 6/2016 | Frankel et al. |
| 2018/0300556 | A1* | 10/2018 | Varerkar ................... G06T 1/20 |
| 2019/0209022 | A1* | 7/2019 | Sobol ................... A61B 5/7435 |
| 2019/0261519 | A1* | 8/2019 | Park ..................... H04N 9/3188 |
| 2019/0362157 | A1* | 11/2019 | Cambias ............... G06K 9/6256 |
| 2020/0126565 | A1* | 4/2020 | Kim ........................ G10L 17/00 |
| 2020/0175326 | A1 | 4/2020 | Shen et al. |
| 2020/0169718 | A1* | 5/2020 | Begeja ................. H04N 13/117 |
| 2020/0225673 | A1* | 7/2020 | Ebrahimi Afrouzi ......................... G05D 1/0214 |
| 2020/0242471 | A1* | 7/2020 | Busch ................. G06K 9/00771 |
| 2020/0284883 | A1* | 9/2020 | Ferreira ................ G01S 7/4816 |
| 2020/0314465 | A1* | 10/2020 | Iyer ..................... G06Q 30/0241 |
| 2020/0386887 | A1* | 12/2020 | Pratt ....................... G01S 17/86 |

* cited by examiner

Detecting a movement based on image processing in images captured by the imager of the one or more imagers and based on detected change in color in pixels of the captured images

301

Cropping an area of the at least one image where the movement is detected

302

Applying a first machine learning (ML) algorithm having a deep neural network architecture to classify an object of interest in the cropped area of the at least one image

SYSTEM AND METHOD FOR IDENTIFYING EVENTS OF INTEREST IN IMAGES FROM ONE OR MORE IMAGERS IN A COMPUTING NETWORK

CROSS REFERENCE TO RELATED APPLICATION

This application is a continuation of application Ser. No. 17/139,312, filed Dec. 31, 2020, which claims priority to and the benefit of Provisional Application No. 62/956,648, filed Jan. 3, 2020, the entire contents of which are incorporate herein by reference in their entireties.

FIELD OF THE INVENTION

The present invention relates to image processing. More particularly, the present invention relates to systems and methods for identifying objects and events of interest from imagers in an edge computing network.

BACKGROUND OF THE INVENTION

In recent years, some current security systems started using software solutions to automatically detect security events by analyzing data received from video cameras (or security cameras). The data received from the video cameras can be processed and/or analyzed to detect events, such as a person approaching a gate, or a car stopping on rail tracks, typically without the need of a human observer to interpret the received data in order to detect that event.

For example, artificial intelligence software algorithms that employ machine learning have been developed to identify objects in a video surveillance feed (e.g., a person with a motorcycle helmet inside a bank). However, such algorithms can typically require substantial computing resources for each processor that analyzes the feed from a security camera, in order to, for example, quickly and accurately detect object or event of interest.

Some security systems can be implemented in an edge computing network, where processors coupled to security cameras perform some basic processing operation while, for example, the majority of analysis is carried out on one or more cloud computers (or central processors). Edge computing can be a distributed computing paradigm that brings computation and/or data storage closer to a location where it can be needed to, for example, improve response times and/or save bandwidth. However, even in such edge computing networks, the problem of limited computing resources can remain, particularly, for example when security cameras consume high bandwidth due to the high bandwidth required of video data traffic (e.g., uploading live video feed to the cloud).

One proposed solution to this problem is enhancing the computing resources of the processors coupled to the security cameras, for instance by upgrading the hardware with additional Graphics Processing Units (GPUs). However, adding additional hardware devices can be costly in terms of money, space, and/or other resources. Therefore, there is still a need for a solution to improve the processing if these security systems without the need for hardware upgrades.

SUMMARY

Systems and methods are provided for improving accuracy of image detection accomplished by machine learning algorithms, while significantly reducing required processing resources based on supporting processing (e.g., with cloud computing).

There is thus provided in accordance with some embodiments of the invention, a method of identifying events of interest in images from one or more imagers in an edge computing network, the method including detecting, by a processor in communication with an imager of the one or more imagers, a movement based on image processing in images captured by the imager of the one or more imagers and based on detected change in color in pixels of the captured images, cropping, by the processor, an area of the at least one image where the movement is detected, applying, by the processor, a first machine learning (ML) algorithm having a deep neural network architecture to classify an object of interest in the cropped area of the at least one image, sending, by the processor, the at least one image to a server in communication with the processor, when the first ML algorithm classifies the object of interest, applying, by the server, a second ML algorithm having a deep neural network architecture to detect the object of interest in the at least one image where the object of interest is detected based on context analysis, and issuing an alert, by the server, when the detected object of interest corresponds to an event of interest. In some embodiments, the context analysis includes detection of at least one object in the at least one image with the detected movement based on at least one image property.

In some embodiments, a dynamic confidence threshold is calculated (e.g., by the processor), by increasing a predefined value when the cropped area of the at least one image corresponds to the event of interest, and the proportions of the cropped area are modified (e.g., by the processor) based on the calculated dynamic confidence threshold. In some embodiments, the first ML algorithm is trained with a dataset of movements based on surroundings detected in the images, and wherein the second ML algorithm is trained with a dataset of movements that trigger rate of identifying events of interest to be above the dynamic confidence threshold.

In some embodiments, the dynamic confidence threshold is determined based on false positive frequency of determining events of interest. In some embodiments, the dynamic confidence threshold is determined based on at least one of: field of view of the imager, level of detected movement, time of day, lighting conditions and history of previously detected events. In some embodiments, a differential movement is calculated, when the one or more imagers is moving. In some embodiments, object detection is performed (e.g., by the processor) on the images. In some embodiments, object detection is performed (e.g., by the server) on the images.

There is thus provided in accordance with some embodiments of the invention, a system for identification of events of interest in images from one or more imagers in an edge computing network, the system including: a processor, in communication with an imager of the one or more imagers, wherein the processor is configured to: detect a movement based on image processing in images captured by the imager of the one or more imagers and based on detected change in color in pixels of the captured images, crop an area of the at least one image where the movement is detected, and apply a first machine learning (ML) algorithm having a deep neural network architecture to classify an object of interest in the cropped area of the at least one image, and a server in communication with the processor, wherein the server is configured to: receive, from the processor, the at least one image, when the first ML algorithm classifies the object of interest, apply a second ML algorithm having a deep neural network architecture to detect the object of interest in the at least one image where the object of interest is detected based on context analysis, and issue an alert, when the detected object of interest corresponds to an event of interest. In some embodiments, the context analysis includes detection of at least one object in the at least one image with the detected movement based on at least one image property.

In some embodiments, the processor is configured to: calculate a dynamic confidence threshold, by increasing a predefined value when the cropped area of the at least one image corresponds to the event of interest, and modify the proportions of the cropped area based on the calculated dynamic confidence threshold. In some embodiments, the first ML algorithm is trained with a dataset of movements based on surroundings detected in the images, and wherein the second ML algorithm is trained with a dataset of movements that trigger rate of identifying events of interest to be above the dynamic confidence threshold.

In some embodiments, the dynamic confidence threshold is determined based on false positive frequency of determining events of interest. In some embodiments, the dynamic confidence threshold is determined based on at least one of: field of view of the imager, level of detected movement, time of day, lighting conditions and history of previously detected events. In some embodiments, the processor is further configured to calculate a differential movement, when the one or more imagers is moving. In some embodiments, the processor is further configured to perform object detection on the at least one image. In some embodiments, the server is further configured to perform object detection on the images.

There is thus provided in accordance with some embodiments of the invention, a method of identifying objects in an edge computing network, the method including cropping, by a processor, an area of at least one image where a movement is detected based on image processing, and based on detected change in color in pixels of the captured image, applying, by the processor, a first machine learning (ML) algorithm having a deep neural network architecture to classify an object of interest in the cropped area of the at least one image, receiving, by a server in communication with the processor, the at least one image, when the first ML algorithm classifies the object of interest, and applying, by the server, a second ML algorithm having a deep neural network architecture to detect the object of interest in the at least one image where the object of interest is detected based on context analysis. In some embodiments, the context analysis includes detection of at least one object in the at least one image with the detected movement based on at least one image property.

In some embodiments, a dynamic confidence threshold is calculated (e.g., by the processor), by increasing a predefined value when the cropped area of the at least one image corresponds to the event of interest, and the proportions of the cropped area are modified (e.g., by the processor) based on the calculated dynamic confidence threshold

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Figure 1:
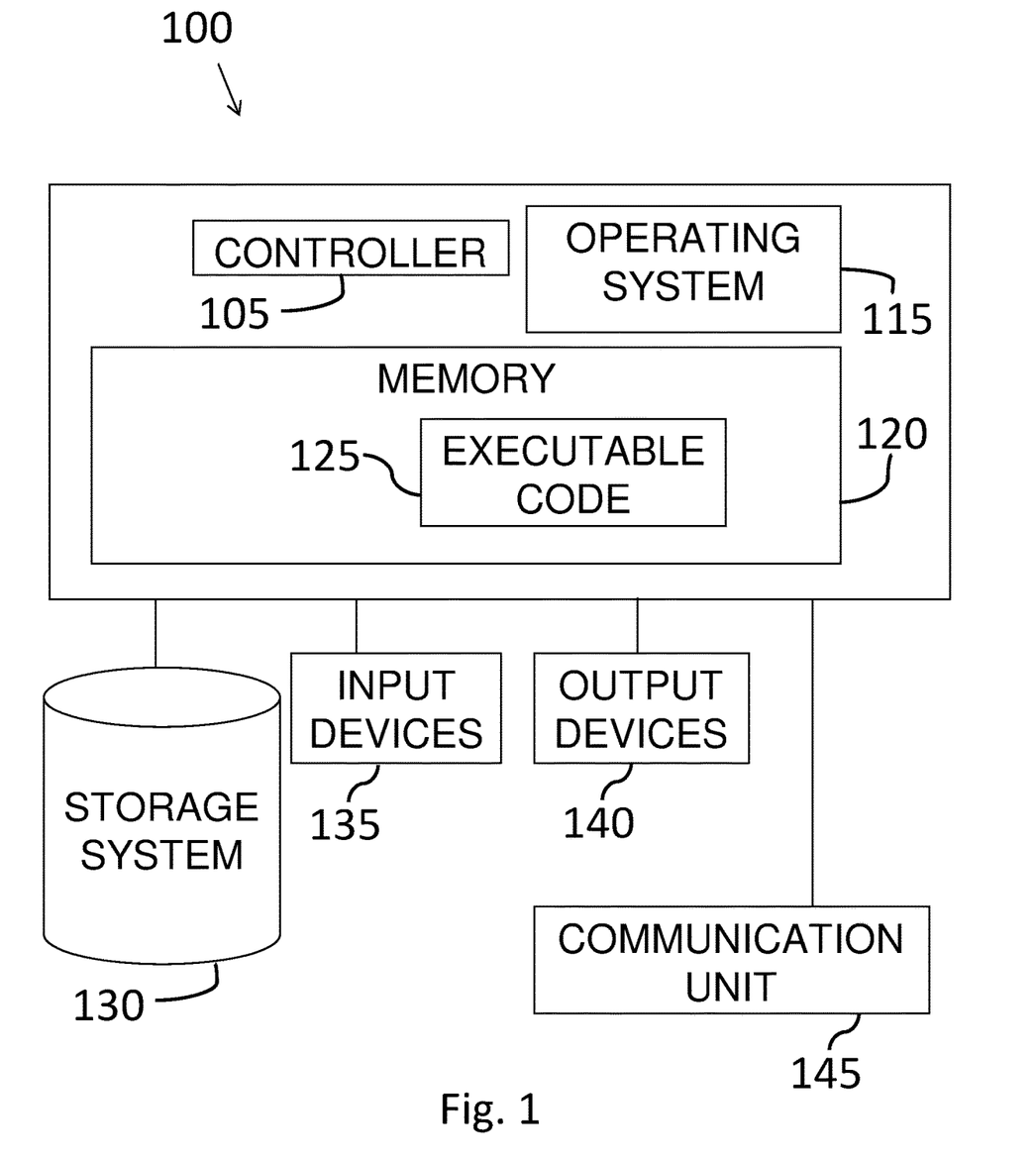
FIG. 1 shows a block diagram of an exemplary computing device, according to some embodiments of the invention.

Reference is made to FIG. 1, which is a schematic block diagram of an example computing device 100, according to some embodiments of the invention. Computing device 100 may include a controller or processor 105 (e.g., a central processing unit processor (CPU), a programmable controller or any suitable computing or computational device), memory 120, storage 130, input devices 135 (e.g. a keyboard or touchscreen), and output devices 140 (e.g., a display), a communication unit 145 (e.g., a cellular transmitter or modem, a Wi-Fi communication unit, or the like) for communicating with remote devices via a computer communication network, such as, for example, the Internet. The computing device 100 may operate by executing an operating system 115 and/or executable code 125. Controller 105 may be configured to execute program code to perform operations described herein. The system described herein may include one or more computing devices 100, for example, to act as the various devices or the components shown in FIG. 2A. For example, system 200 may be, or may include computing device 100 or components thereof.

Operating system 115 may be or may include any code segment or one or more code sets (e.g., one similar to executable code 125 described herein) designed and/or configured to perform tasks involving coordinating, scheduling, arbitrating, supervising, controlling or otherwise managing operation of computing device 100, for example, scheduling execution of software programs or enabling software programs or other modules or units to communicate.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may be a software application that performs methods as further described herein. Although, for the sake of clarity, a single item of executable code 125 is shown in FIG. 1, a system according to some embodiments of the invention may include a plurality of executable code segments similar to executable code 125 that may be stored into memory 120 and cause controller 105 to carry out methods described herein.

Storage 130 may be or may include, for example, a hard disk drive, a universal serial bus (USB) device or other suitable removable and/or fixed storage unit. In some embodiments, some of the components shown in FIG. 1 may be omitted. For example, memory 120 may be a non-volatile memory having the storage capacity of storage 130. Accordingly, although shown as a separate component, storage 130 may be embedded or included in memory 120.

Input devices 135 may be or may include a keyboard, a touch screen or pad, one or more sensors or any other or additional suitable input device. Any suitable number of input devices 135 may be operatively connected to computing device 100. Output devices 140 may include one or more displays or monitors and/or any other suitable output devices. Any suitable number of output devices 140 may be operatively connected to computing device 100. Any applicable input/output (I/O) devices may be connected to computing device 100 as shown by blocks 135 and 140. For example, a wired or wireless network interface card (NIC), a universal serial bus (USB) device or external hard drive may be included in input devices 135 and/or output devices 140.

Some embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, an article may include a storage medium such as memory 120, computer-executable instructions such as executable code 125 and a controller such as controller 105. Such a non-transitory computer readable medium may be, for example, a memory, a disk drive, or a USB flash memory, encoding, including or storing instructions, e.g., computer-executable instructions, which, when executed by a processor or controller, carry out methods disclosed herein. The storage medium may include, but is not limited to, any type of disk including, semiconductor devices such as read-only memories (ROMs) and/or random-access memories (RAMs), flash memories, electrically erasable programmable read-only memories (EEPROMs) or any type of media suitable for storing electronic instructions, including programmable storage devices. For example, in some embodiments, memory 120 is a non-transitory machine-readable medium.

A system according to some embodiments of the invention may include components such as, but not limited to, a plurality of central processing units (CPU) or any other suitable multi-purpose or specific processors or controllers (e.g., controllers similar to controller 105), a plurality of input units, a plurality of output units, a plurality of memory units, and a plurality of storage units. A system may additionally include other suitable hardware components and/or software components. In some embodiments, a system may include or may be, for example, a personal computer, a desktop computer, a laptop computer, a workstation, a server computer, a network device, or any other suitable computing device. For example, a system as described herein may include one or more facility computing device 100 and one or more remote server computers in active communication with one or more facility computing device 100 such as computing device 100, and in active communication with one or more portable or mobile devices such as smartphones, tablets and the like.

According to some embodiments, systems and methods are provided for identification of events of interest in captured video feed using machine learning, in an edge computing network. For example, an edge device may be coupled to a security camera, and the captured video feed may be processed at a remote server (e.g., a cloud-based server). The edge device may perform classification machine learning on the captured video, and the remote server may perform deep machine learning on the same video in order to identify the event(s) of interest and reduce the number of false positives, while also minimizing the required processing resources for such identification.

For example, when similar processing resources (e.g., on the same processing chip) are considered, previous solutions may have input high-definition video feed of 1920×1080 resolution with 30 frames per second (FPS) that is transferred to an array of 1080×1080 for object detection at a rate of two second per image for a single video stream. For the same processing resources, the systems and methods provided by embodiments of the present invention, may handle eight video streams of high-definition video feed of 1920×1080 resolution with 30 FPS that is transferred to an array of 1080×1080 for object detection at a rate of 0.03 seconds per image (or 24 FPS) for eight video streams. Accordingly, the same result may be achieved with reduced processing resources, or the same resources (e.g., for existing security cameras) may be used for processing of a significantly larger amount of data as a result of the systems and methods described hereinafter.

Figure 2A:
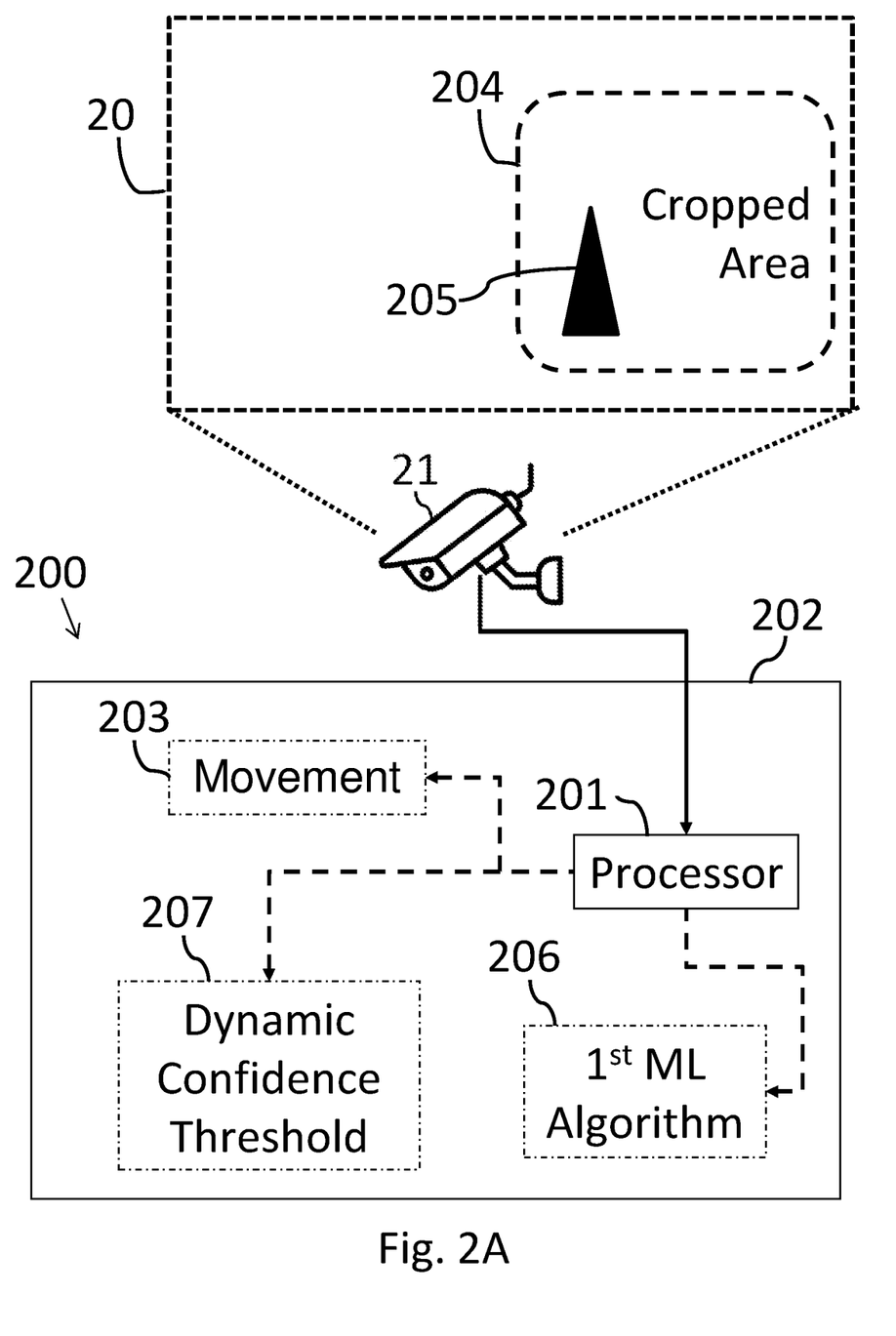
FIG. 2A shows a block diagram of a system for identification of events of interest in images from one or more imagers in an edge computing network, according to some embodiments of the invention.

Reference is now made to FIG. 2A, which shows a block diagram of a portion of system 200 for identification of events of interest in images 20 from one or more imagers 21 in an edge computing network, according to some embodiments. In FIG. 2A, hardware elements are indicated with a solid line and the direction of arrows may indicate the direction of information flow.

Figure 2B:
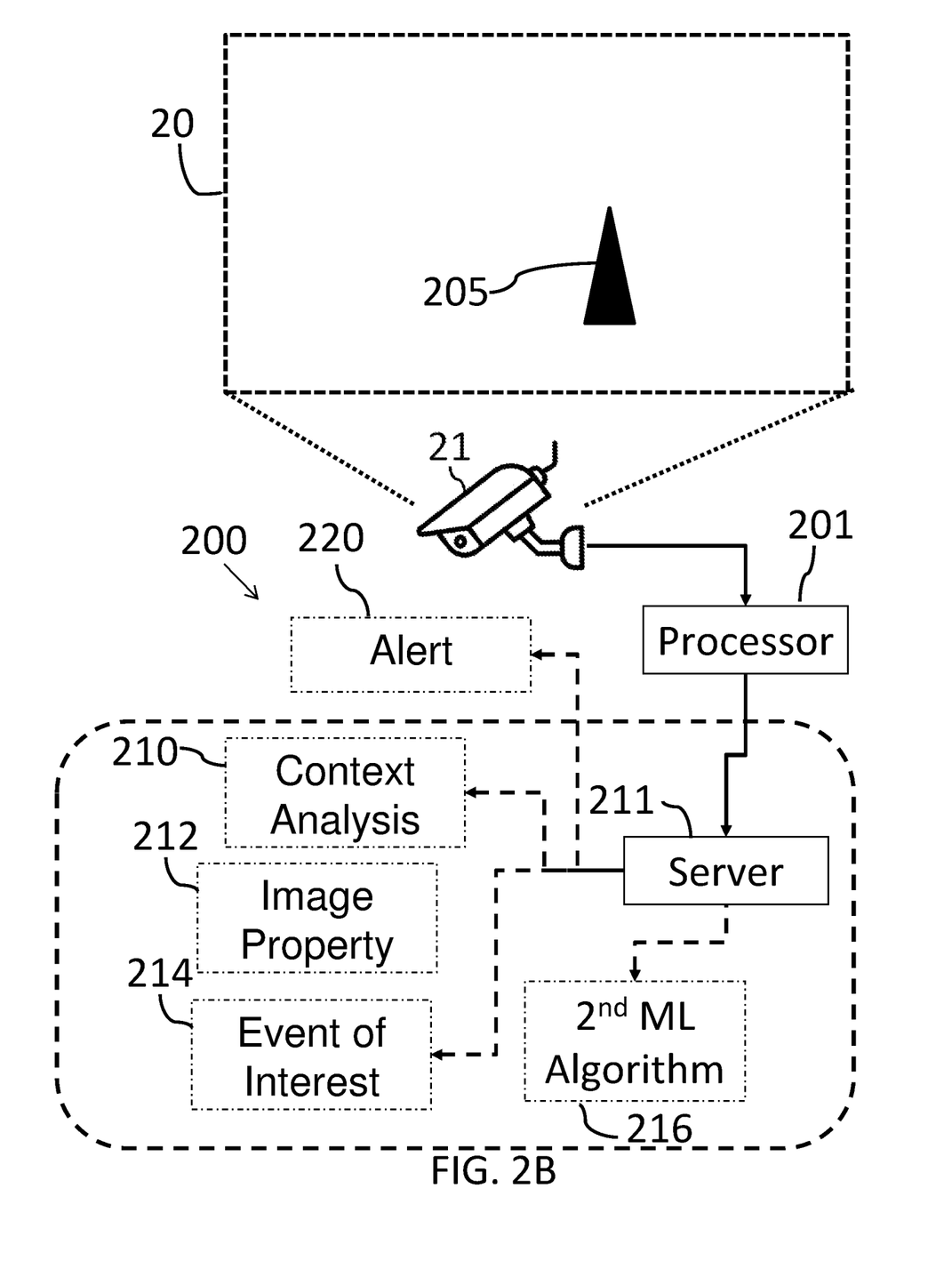
FIG. 2B shows a block diagram of the system for identification of events of interest in images from one or more imagers in an edge computing network, according to some embodiments of the invention.

The system 200 may include a processor 201 in communication with an imager 21 (e.g., a surveillance video camera, a motion detection camera, an indoor camera, etc.) of the one or more imagers. The system 200 may also include a server 211 (as shown in FIG. 2B), in communication with the processor 201, to perform additional computing tasks, as further described hereinafter. In some embodiments, the processor 201 is embedded in a hardware component 202 (e.g., a computing device such as device 100 shown in FIG. 1) that may be coupled to the imager 21 (e.g., to make a simple video camera into a "smart-camera").

While a single processor 201 is shown in FIG. 2A, the system 200 may include a plurality of processors 201, each coupled to a single imager 21, where the processing may be carried out individually for each processor 201.

According to some embodiments, the processor 201 is configured to detect a movement 203 based on image processing in images 20 captured by the imager 21 of the one or more imagers, and/or based on detected change in color in pixels of the captured images 20. In order to detect the movement 203, an object moving in the field of view of the imager 21 may be tracked. In some embodiments, at least one target image (e.g., a front yard) is defined for image processing in order to detect the movement.

The one or more imagers may monitor a target environment to identify stability and/or movement and/or position of objects in the target environment. For example, the processor 201 may receive a video feed from the imager 21 such that a stream of at least 20 images may be analyzed to determine a movement of an object of interest.

In some embodiments, the processor 201 crops an area 204 of the at least one image 20, where the movement 203 is detected. For example, the imager 21 may monitor a target environment of a backyard and detect that a movement 203 is carried out by an object 205. Accordingly, the processor 201 may crop the area 204 of image 20, where the moving object 205 is detected.

In some embodiments, the processor 201 is configured to calculate a differential movement of the object 205, when the one or more imagers 21 is moving.

According to some embodiments, the processor 201 applies a first machine learning (ML) algorithm 206, for instance having a deep neural network architecture, to classify an object of interest 205 in the cropped area 204 of the at least one image 20. Object classification and/or object detection may include image processing to detect of a specific object in a portion of a statice image of the field of view. Therefore, the first ML algorithm 206 may be trained to detect a particular object 205 (e.g., a person, a vehicle, etc.) in the cropped area 204.

In some embodiments, the first ML algorithm 206 is trained with supervised learning by a human observer that tags moving objects over a timeline. For example, the first ML algorithm 206 may be trained with sample cropped images representing the head area of people wearing bike helmets and cropped images representing the head area of people wearing construction helmets, such that the first ML algorithm 206 may be trained to classify a new cropped image of a person wearing a helmet (e.g., identifying a person wearing a bike helmet with only 7%, while result identifying a person wearing a construction helmet with 85% confidence score). In another example, the first ML algorithm 206 may have a convolutional neural network architecture that is configured for low processing resources such as an architecture with a neural network with fewer layers that may result in less accurate predictions. For the same processing resources (e.g., carried out on the same CPU), a deep neural network performing image classification may take 300 milliseconds to process, a convolutional neural network architecture that is configured for low processing resources, with less layers, may take 30 milliseconds to process, and a deep neural network performing object detection may take 1200 milliseconds to process. In some embodiments, the first ML algorithm 206 is trained with a dataset of movements based on surroundings detected in the at least one image 20, for instance trained with movements dedicated to a bank interior.

A neural network (NN), e.g. a neural network implementing machine learning, may refer to an information processing paradigm that may include nodes, referred to as neurons, organized into layers, with links between the neurons. The links may transfer signals between neurons and may be associated with weights. A NN may be configured or trained for a specific task, e.g., pattern recognition or classification. Training a NN for the specific task may involve adjusting these weights based on examples. Each neuron of an intermediate or last layer may receive an input signal, e.g., a weighted sum of output signals from other neurons, and may process the input signal using a linear or nonlinear function (e.g., an activation function). The results of the input and intermediate layers may be transferred to other neurons and the results of the output layer may be provided as the output of the NN. Typically, the neurons and links within a NN are represented by mathematical constructs, such as activation functions and matrices of data elements and weights. A processor, e.g. CPUs or graphics processing units (GPUs), or a dedicated hardware device may perform the relevant calculations.

In some embodiments, the processor 201 is configured to perform object detection on the at least one image 20.

According to some embodiments, the processor 201 is configured to calculate a dynamic confidence threshold 207, by increasing a predefined value when the cropped area 204 of the at least one image 20 corresponds to a determined event of interest, and modify the proportions of the cropped area based on the calculated dynamic confidence threshold 207. In some embodiments, events that are below the threshold are discarded by the processor 201, and events that exceed the threshold are to be sent to the server 211 for further analysis on the surroundings of the cropped area 204.

In some embodiments, the dynamic confidence threshold 207 is determined based on false positive frequency of determining events of interest. In some embodiments, the dynamic confidence threshold 207 is determined based on at least one of: field of view of the imager, level of detected movement, time of day, lighting conditions and history of previously detected events.

In some embodiments, the dynamic confidence threshold 207 may be modified in accordance with at least one of: area in the field of view of the imager 21, levels of detected motion, classes of the classified object, time of day, lighting conditions, and history of detected events.

In some embodiments, the threshold may be varied across different processors 201, to optimize the performance of the system where some imagers 21 are located in more favorable arenas than others. In some embodiments, the threshold is varied within an individual imager according to local considerations of illumination, range to target, vibration of camera etc., to reduce detection errors by adjusting the threshold to the local a-priori probability of error.

Reference is now made to FIG. 2B, which shows a block diagram of the system 200 for identification of events of interest in images 20 from one or more imagers 21 in an edge computing network, according to some embodiments. In FIG. 2B, hardware elements are indicated with a solid line and the direction of arrows may indicate the direction of information flow.

The server 211, in communication with the processor 201, may be configured to receive, from the processor 201, the at least one image 20, when the first ML algorithm 206 classifies the object of interest 205 (e.g., as shown in FIG. 2A). In some embodiments, the at least one image 20 includes images with the detected movement 203.

In contrast to the first ML algorithm 206 that only processes the cropped area 204, the server 211 received the full image 20 for processing. Thus, the server 211 may perform more complex computations compared to the computations performed by the processor 201. For example, the first ML algorithm 206 may determine that the cropped area 204 includes a moving human, while the server may apply an additional ML algorithm to identify a human in the entire image.

In some embodiments, the server 211 filters out (e.g., as false positives) objects identified by the processor 201 that are not moving. For example, the server 211 may receive information from the processor 201 that the identified object is a stationary object (e.g., a tree) such that the server 211 may not even begin processing the image where the object was identified by the processor 201.

In some embodiments, the server 211 applies a second ML algorithm 216, having a deep neural network architecture, to detect the object of interest 205 in the received at least one image 20. For example, the object of interest 205 may be detected utilizing object detection, where a pattern (e.g., a rectangle or any other shape) may be determined around a discrete moving object in the field of view of a static camera. In some embodiments, the object detection is carried out based on context analysis for the received at least one image 20, as further described hereinafter.

In some embodiments, the second ML algorithm 216 is trained with a dataset of images, with tagged objects, to be identified as events of interest. For example, the second ML algorithm 216 may be trained to perform object detection (e.g., with supervised training) with a sample of a full image, including the background scene, that includes a tagging for the object location in the image (e.g., identifying a person wearing a yellow jacket at a construction site). When a new image is received, the second ML algorithm 216 may identify the object of interest in a full image that includes other objects in the background (e.g., identify a person in a construction site with 60% of confidence score).

In some embodiments, the processor 201 executes all actions in the system 200, without the need for the server 211. For example, the processor 201 may execute the first ML algorithm 206 (e.g., used more than 99% of the time) to identify events of interest using substantially low processing resources, compared to the server 211.

In some embodiments, the first ML algorithm 206 is trained with a dataset of movements based on surroundings detected in the images, and wherein the second ML algorithm 216 is trained with a dataset of movements that trigger rate of identifying events of interest to be above the dynamic confidence threshold 207.

According to some embodiments, the object of interest 205 is detected based on context analysis 210. The context analysis 210 may include detection of at least one object 205 in the at least one image 20 based information (e.g., graphic and non-graphic) on at least one image property 212. The at least one image property 212 may include information on surroundings (e.g., for spatial object detection) that is derived from the vicinity of a detected object. For example, the at least one image property 212 may include lighting or weather conditions (e.g., sunny, cloudy, raining, etc.), time of day, proportional size of objects (e.g., size of a cat versus an adult man), and type of objects in the scene (e.g., cars, a fence, trees, etc.).

In some embodiments, the processor 201 reduces the dynamic confidence threshold 207 based on results of the context analysis 210, while the training to perform the dynamic confidence threshold 207 by the processor 201 as well as the training to perform the context analysis 210 may be similar. Since context analysis 210 is based on real world attributes in the image such as weather conditions (e.g., sunny, cloudy, raining, etc.), when the dynamic confidence threshold 207 is modified in accordance with the context analysis 210, false positive results may be eliminated (and the trust may be increased).

According to some embodiments, the dynamic confidence threshold 207 may be modified based on results of the context analysis 210, where the processor 201 may operate a dedicate ML module based on the results of the context analysis 210. For example, the context analysis 210 may detect rain so that the dynamic confidence threshold 207 is accordingly modified and the processor 201 applies a dedicated ML module that has been previously train on datasets in similar weather conditions.

According to some embodiments, the server 211 issues an alert 220 (e.g., to a predefined user), when the detected object of interest 205 corresponds to an event of interest 214. The event of interest 214 or a security event may be detected in the field of view using the first ML algorithm 206 and the second ML algorithm 216.

In some embodiments, the server 211 is configured to perform object detection on the image 20. In some embodiments, the server 211 is configured to perform object detection on a portion of the image 20, for example zooming in onto an area of interest within the image 20.

In some embodiments, the server 211 adjusts the dynamic confidence threshold 207 according to at least one of the following: frequency of false alarms by the processor 201, and frequency of miss-detections by the processor 201 (e.g., events that are known or have happened in the field of view but were not reported by the processor 201).

Figure 3A:
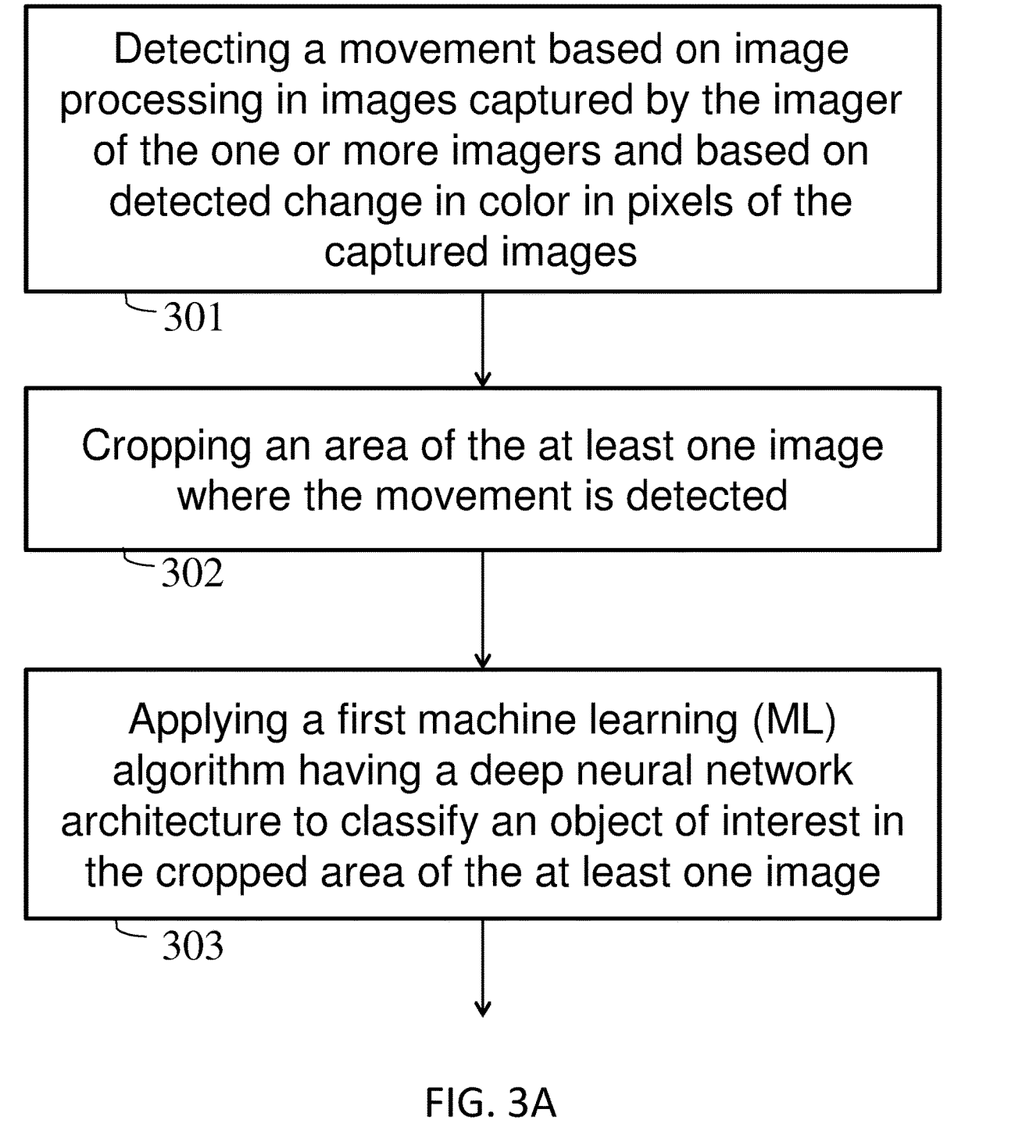
FIGS. 3A-3B show a flowchart of a method of identifying events of interest in images from one or more imagers in an edge computing network.
Figure 3B:
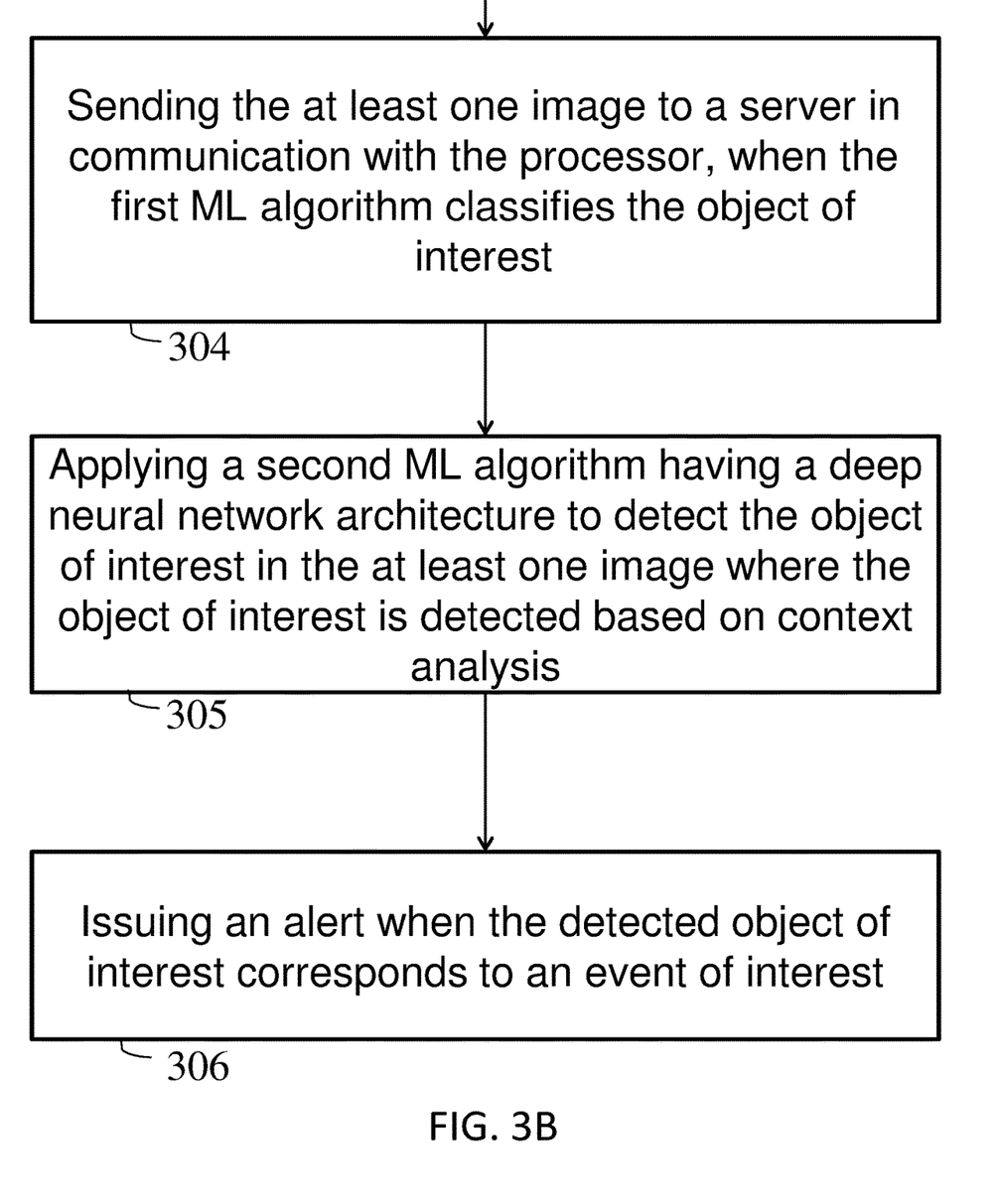

Reference is now made to FIGS. 3A-3B, which show a flowchart of a method of identifying events of interest in images from one or more imagers in an edge computing network, according to some embodiments.

In Step 301, a movement may be detected (e.g., by a processor in communication with an imager) based on image processing in images captured by the imager of the one or more imagers and based on detected change in color in pixels of the captured images. In Step 302, an area of the at least one image may be cropped (e.g., by the processor) where the movement is detected.

In Step 303, a first ML algorithm may be applied (e.g., by the processor) having a deep neural network architecture to classify an object of interest in the cropped area of the at least one image. In Step 304, the at least one image may be sent (e.g., by the processor) to a server in communication with the processor, when the first ML algorithm classifies the object of interest.

In Step 305, a second ML algorithm may be applied (e.g., by the server) having a deep neural network architecture to detect the object of interest in the at least one image where the object of interest is detected based on context analysis. In Step 306, an alert may be issued (e.g., by the server) when the detected object of interest corresponds to an event of interest.

In some embodiments, the context analysis includes detection of at least one object in the at least one image with the detected movement based on at least one image property.

In some embodiments, the use of a chain of at least three steps in detection of a security event, namely motion detection, object classification and surrounding analysis, reduces the false positive and false negative errors of detection and relieves the edge processor from high computational load.

Figure 4:
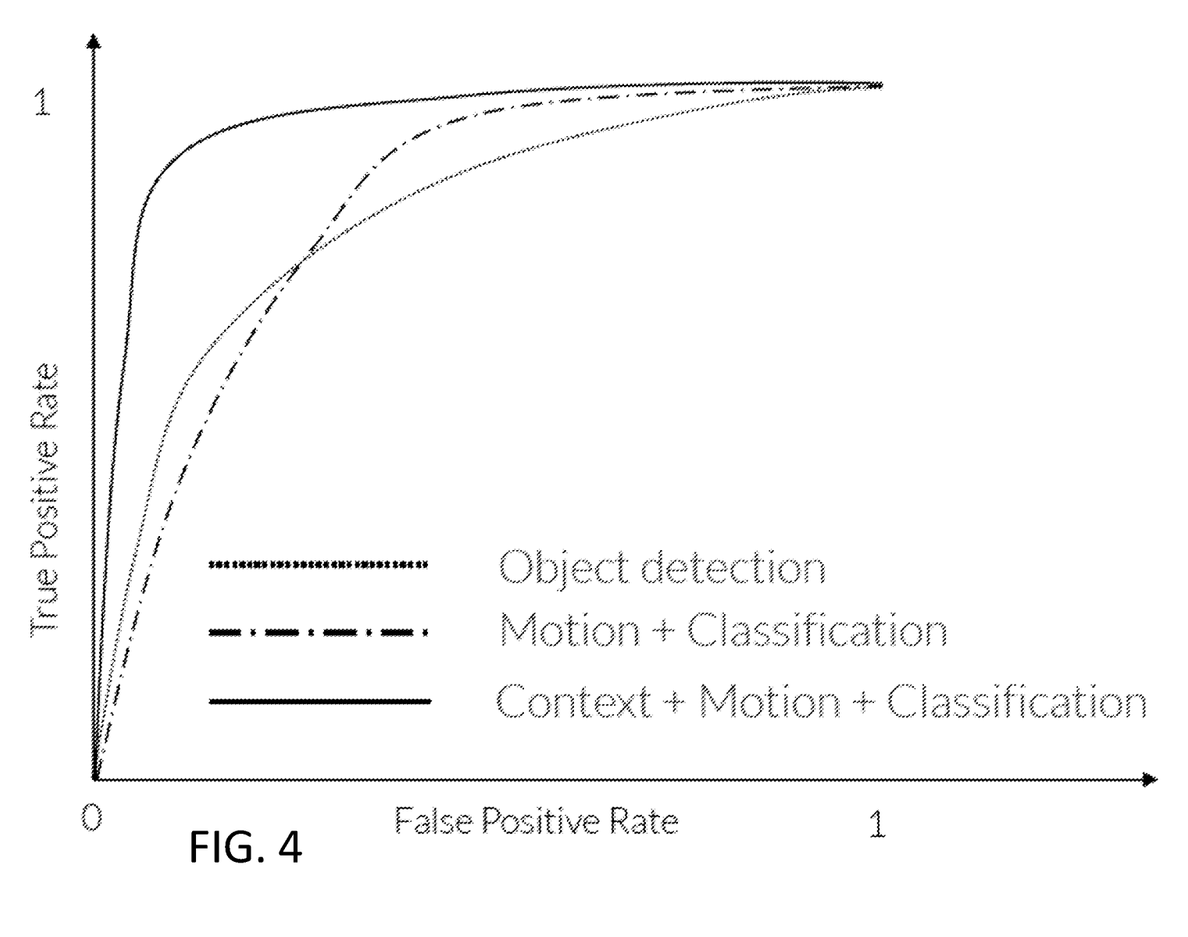
FIG. 4 shows a graph of the influence of object detection with context analysis on the false positive rate, according to some embodiments of the invention.

Reference is now made to FIG. 4, which shows a graph of the influence of object detection context analysis on the false positive rate, according to some embodiments. It is apparent from the graph in FIG. 4 that by combining calculation of motion detection, context analysis and classification, the rate of false positives is reduced in contrast to object detection alone, or the combination of classification and motion detection.

Figure 5A:
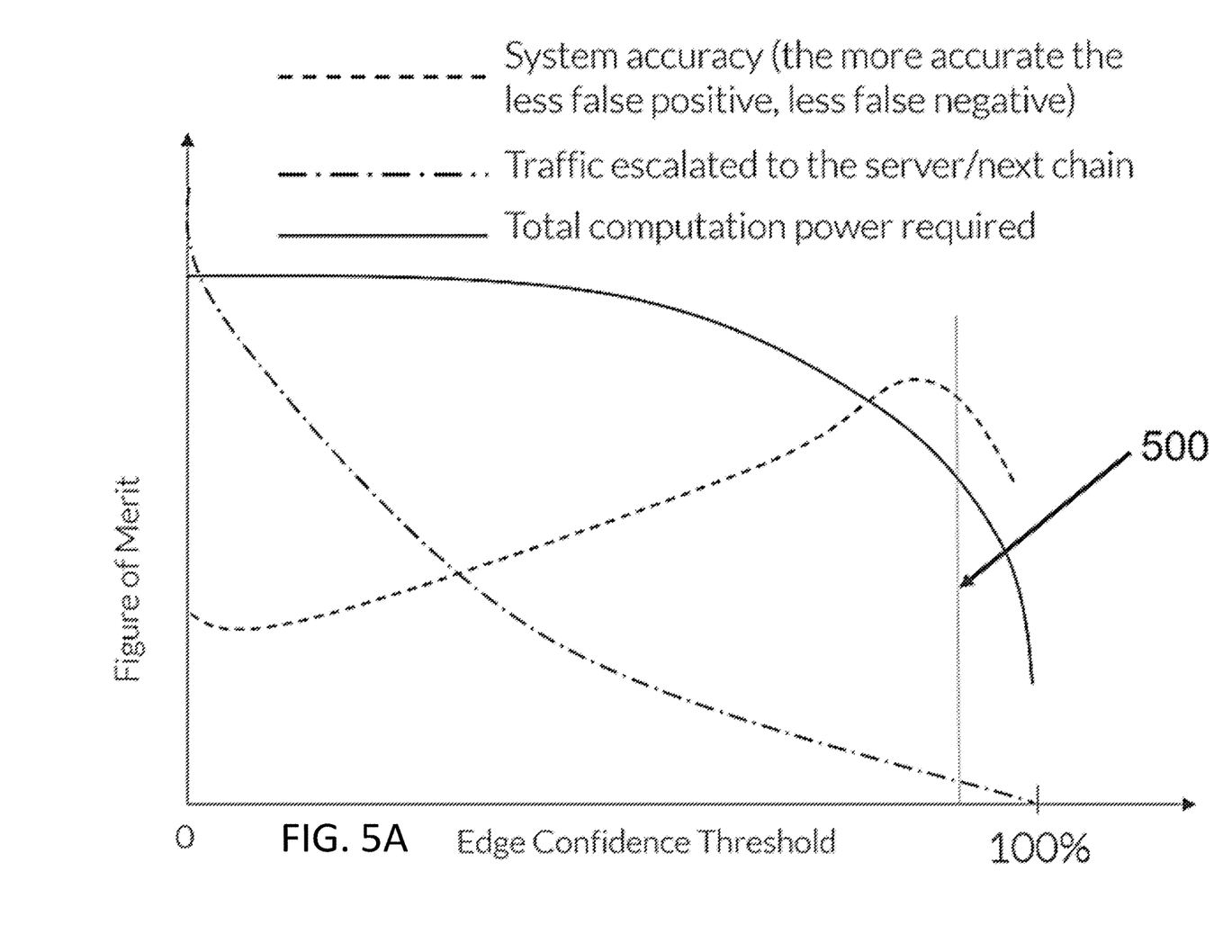
FIGS. 5A-5B show graphs of the influence of dynamic confidence threshold on the false positive rate, according to some embodiments of the invention.
Figure 5B:
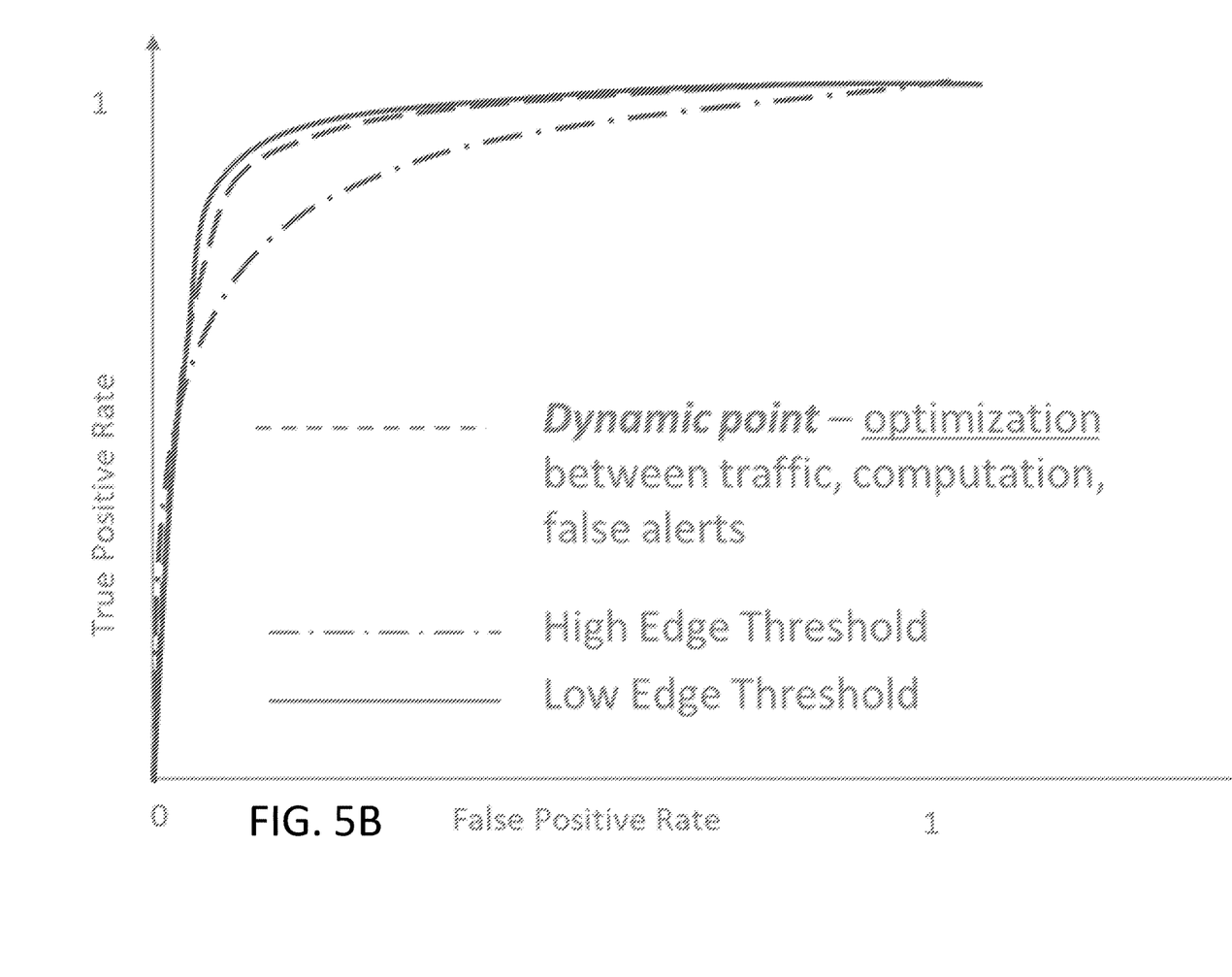

Reference is now made to FIGS. 5A-5B, which show graphs of the influence of dynamic confidence threshold on the false positive rate, according to some embodiments. It is apparent from the graphs in FIG. 5A and FIG. 5B that a dynamic point 500 may be indicated where the dynamic confidence threshold is at a level sufficiently low to minimize the required processing resources while keeping the false positive rate low as well, for the same traffic of video feed.

The dynamic point 500 is indicated by a system accuracy curve, which describes low false alert rate and no missing out or false negative. The dynamic confidence threshold minimizes traffic to the server, by relying mostly on the edge processing power (e.g., more than 95%) such that the total computation power required becomes lower, while benefiting higher accuracy from the combination of both dynamic confidence threshold and context analysis. A higher threshold may cause an increase in false negative, thereby missing a real event, and a lower threshold may cause an increase in the false alert rate, thereby requiring more traffic towards the server and/or more computation power of the server. Accordingly, the dynamic confidence threshold is based on the combination of the edge processing and the server processing, with higher accuracy than possible with each component working individually, while reducing traffic to the server as well as reducing computation power in the system.

While certain features of the invention have been illustrated and described herein, many modifications, substitutions, changes, and equivalents may occur to those skilled in the art. It is, therefore, to be understood that the appended claims are intended to cover all such modifications and changes as fall within the invention.

Various embodiments have been presented. Each of these embodiments may, of course, include features from other embodiments presented, and embodiments not specifically described may include various features described herein.

The invention claimed is:

1. A method of identifying events of interest in images from one or more imagers in an edge computing network, the method comprising:
   detecting, by a processor in communication with an imager of the one or more imagers, a movement based on image processing in images captured by the imager of the one or more imagers and based on detected change in color in pixels of the captured images;
   cropping, by the processor, an area of the at least one image where the movement is detected;
   applying, by the processor, a first machine learning (ML) algorithm having a deep neural network architecture to classify an object of interest in the cropped area of the at least one image;
   calculating, by the processor, a dynamic confidence threshold, by increasing a predefined value based on the cropped area of the at least one image corresponding to an event of interest;
   modifying, by the processor, proportions of the cropped area based on the calculated dynamic confidence threshold;
   sending, by the processor, the at least one image to a server in communication with the processor, when the first ML algorithm classifies the object of interest;
   applying, by the server, a second ML algorithm having a deep neural network architecture to detect the object of interest in the at least one image where the object of interest is detected based on context analysis; and
   issuing an alert, by the server, when the detected object of interest corresponds to the event of interest,
   wherein the context analysis comprises detection of the object in the at least one image with the detected movement based on at least one image property, and wherein the first ML algorithm is trained with a dataset of movements based on surroundings detected in the images, and wherein the second ML algorithm is trained with a dataset of movements that trigger rate of identifying events of interest to be above the dynamic confidence threshold.

2. The method of claim 1, wherein the dynamic confidence threshold is determined based on false positive frequency of determining events of interest.

3. The method of claim 1, wherein the dynamic confidence threshold is determined based on at least one of: field of view of the imager, level of detected movement, time of day, lighting conditions and history of previously detected events.

4. The method of claim 1, further comprising calculating a differential movement, when the one or more imagers is moving.

5. The method of claim 1, performing, by the processor, object detection on the images.

6. The method of claim 1, performing, by the server, object detection on the images.

7. A system for identification of events of interest in images from one or more imagers in an edge computing network, the system comprising:
   a processor, in communication with an imager of the one or more imagers, wherein the processor is configured to:

detect a movement based on image processing in images captured by the imager of the one or more imagers and based on detected change in color in pixels of the captured images;

crop an area of the at least one image where the movement is detected; and apply a first machine learning (ML) algorithm having a deep neural network architecture to classify an object of interest in the cropped area of the at least one image;

calculate a dynamic confidence threshold, by increasing a predefined value based on the cropped area of the at least one image corresponding to an event of interest;

modify proportions of the cropped area based on the calculated dynamic confidence threshold; and a server in communication with the processor, wherein the server is configured to:

receive, from the processor, the at least one image, when the first ML algorithm classifies the object of interest;

apply a second ML algorithm having a deep neural network architecture to detect the object of interest in the at least one image where the object of interest is detected based on context analysis; and issue an alert, when the detected object of interest corresponds to the event of interest, wherein the context analysis comprises detection of the object in the at least one image with the detected movement based on at least one image property, and wherein the first ML algorithm is trained with a dataset of movements based on surroundings detected in the images, and wherein the second ML algorithm is trained with a dataset of movements that trigger rate of identifying events of interest to be above the dynamic confidence threshold.

8. The system of claim 7, wherein the dynamic confidence threshold is determined based on false positive frequency of determining events of interest.

9. The system of claim 7, wherein the dynamic confidence threshold is determined based on at least one of: field of view of the imager, level of detected movement, time of day, lighting conditions and history of previously detected events.

10. The system of claim 7, wherein the processor is further configured to calculate a differential movement, when the one or more imagers.

11. The system of claim 7, wherein the processor is further configured to perform object detection on the at least one image.

12. The system of claim 7, wherein the server is further configured to perform object detection on the images.

13. A method of identifying objects in an edge computing network, the method comprising:

cropping, by a processor, an area of at least one image where a movement is detected based on image processing, and based on detected change in color in pixels of the captured image;

applying, by the processor, a first machine learning (ML) algorithm having a deep neural network architecture to classify an object of interest in the cropped area of the at least one image;

calculating, by the processor, a dynamic confidence threshold, by increasing a predefined value based on the cropped area of the at least one image corresponding to an event of interest; and modifying, by the processor, proportions of the cropped area based on the calculated dynamic confidence threshold;

receiving, by a server in communication with the processor, the at least one image, when the first ML algorithm classifies the object of interest; and applying, by the server, a second ML algorithm having a deep neural network architecture to detect the object of interest in the at least one image where the object of interest is detected based on context analysis, wherein the context analysis comprises detection of the object in the at least one image with the detected movement based on at least one image property, and wherein the first ML algorithm is trained with a dataset of movements based on surroundings detected in the images, and wherein the second ML algorithm is trained with a dataset of movements that trigger rate of identifying events of interest to be above the dynamic confidence threshold.

\* \* \* \* \*